US007138580B2

(12) United States Patent
Boutin

(10) Patent No.: US 7,138,580 B2
(45) Date of Patent: Nov. 21, 2006

(54) PROTECTIVE COVER FOR FASTENED ELECTRICAL CONNECTORS

(75) Inventor: Kris Boutin, Mont Vernon, NH (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 11/351,604

(22) Filed: Feb. 10, 2006

(65) Prior Publication Data

US 2006/0237214 A1    Oct. 26, 2006

Related U.S. Application Data

(62) Division of application No. 11/114,571, filed on Apr. 25, 2005.

(51) Int. Cl.
   *H01R 4/00* (2006.01)
(52) U.S. Cl. ............ 174/84 R; 174/88 R; 174/92
(58) Field of Classification Search ............ 174/36, 174/110 R, 113 R, 92, 93
   See application file for complete search history.

(56) References Cited

U.S. PATENT DOCUMENTS

| | | | | |
|---|---|---|---|---|
| 1,708,292 A | * | 4/1929 | Buys | 174/92 |
| 1,751,826 A | * | 3/1930 | Marshall | 200/572 |
| 3,112,148 A | | 11/1963 | Wochner | 339/116 |
| 3,147,338 A | | 9/1964 | Ekvall et al. | 174/138 |
| 3,484,541 A | * | 12/1969 | Campbell | 174/138 F |
| 3,614,298 A | * | 10/1971 | Thompson et al. | 174/92 |
| 3,629,806 A | * | 12/1971 | Wiechmann | 439/521 |
| 3,728,467 A | * | 4/1973 | Klayum et al. | 174/38 |
| 4,339,629 A | | 7/1982 | Stanmore | 174/50 |
| 4,451,696 A | | 5/1984 | Beinhaur | 174/92 |
| 4,865,557 A | | 9/1989 | Kershaw | 439/133 |
| 5,017,739 A | * | 5/1991 | Hoffman et al. | 174/138 F |
| 5,183,966 A | * | 2/1993 | Hurtado et al. | 174/20 |
| 5,266,740 A | | 11/1993 | Hsu | 174/72 C |
| 5,439,759 A | | 8/1995 | Lippert et al. | 429/65 |
| 5,556,288 A | | 9/1996 | Ishii et al. | 439/135 |
| 5,594,212 A | * | 1/1997 | Nourry et al. | 174/88 R |
| 5,645,448 A | | 7/1997 | Hill | 439/522 |
| 5,821,463 A | * | 10/1998 | Ngo | 174/84 C |

(Continued)

OTHER PUBLICATIONS

"Insulated Phase Line Connectors", CMC/ESP Utility Products, Type APC Insulating Cover, p. G-14, Apr. 2002.

(Continued)

*Primary Examiner*—William H. Mayo, III
(74) *Attorney, Agent, or Firm*—Harrington & Smith, LLP

(57) ABSTRACT

A protective cover for securely housing at least one fastened electrical connector. The protective cover includes a top section and a bottom section moveably connected to one another, with the cover having a plurality of portals therein for receiving a plurality of electrical conductors therethrough. The bottom section of the cover includes a top surface having a recess in a portion leading down into a connection compartment which has a connection area. The connection area is provided with one or more orifices, with an accompanying channel for each of the one or more orifices extending down within the connection area. The one or more orifices with the accompanying channel are adapted to receive and securely house a lower portion of at least one fastener of the at least one fastened connector.

19 Claims, 13 Drawing Sheets

U.S. PATENT DOCUMENTS

| | | | |
|---|---|---|---|
| 6,218,620 B1 * | 4/2001 | Michel | 174/92 |
| 6,328,604 B1 | 12/2001 | Inoue et al. | 439/627 |
| 6,333,464 B1 * | 12/2001 | Ellison | 174/92 |
| 6,359,228 B1 * | 3/2002 | Strause et al. | 174/91 |
| 6,664,475 B1 * | 12/2003 | Ellison | 174/92 |
| 6,676,454 B1 | 1/2004 | De France | 439/806 |

OTHER PUBLICATIONS

"Aluminum Multi-Tap Stud Terminal Connectors and Protective Boots" Fargo Mfg. Company, Inc., p. 5, GA-266SB, Feb. 1988.

* cited by examiner

PROTECTIVE COVER FOR FASTENED ELECTRICAL CONNECTORS

CROSS REFERENCE TO RELATED APPLICATION

This is a divisional patent application of copending U.S. patent application Ser. No. 11/114,571 filed Apr. 25, 2005.

BACKGROUND OF THE INVENTION

1. Field of the Invention

The invention relates to protective covers for electrical connectors and, more particularly, to an improved protective cover for fastened electrical connectors (e.g. bolted electrical connectors).

2. Brief Description of Prior Developments

The use of protective covers for protecting electrical connectors from water, dust and other contaminants is known in the art. However, with most conventional covers, the electrical connector is not firmly secured in place within the cover, thereby leading to problems related to movement or shifting of the connector within the cover. In addition, conventional covers are also limited in the number and types of electrical connectors which they may house.

Examples of protective covers known in the art for housing electrical connectors are described in U.S. Pat. No. 3,112,148, U.S. Pat. No. 3,147,338 and U.S. Pat. No. 5,556,288. Specifically, U.S. Pat. No. 3,112,148 relates to a protective sheath for an electric connector and means for mounting and positioning the connector in the sheath. U.S. Pat. No. 3,147,338 relates to two-section hinged covers providing an insulating enclosure for bare connections of insulated wiring. U.S. Pat. No. 5,556,228 relates to protective covers for protecting a plurality of terminals within a housing from dust or dirt and the like during a period of time until being assembled on a vehicle, and the like. Further examples of protective covers for electrical connectors and/or related devices are described in U.S. Pat. No. 3,629,806, U.S. Pat. No. 4,339,629, U.S. Pat. No. 4,451,696, U.S. Pat. No. 4,865,557, U.S. Pat. No. 5,226,740, U.S. Pat. No. 5,439,759 and U.S. Pat. No. 5,645,448.

Despite the above advances, there is still a strong need in the art for a protective cover which securely and firmly houses fastened electrical (e.g. bolted electrical connectors) in place within the cover, such that these electrical connectors do not move or shift when housed within the cover. There is also a need in the art for a universal protective cover which may securely house several different combinations of electrical connectors therein using the same cover. Moreover, there is also a need in the art for a cover which allows the user to inspect or perform other work on the electrical connector while housed within the cover; without having to hold the connector in place.

The invention accomplishes the above needs in the art and also provides other advantages, as will be described in detail below.

SUMMARY OF THE INVENTION

Figure 1:
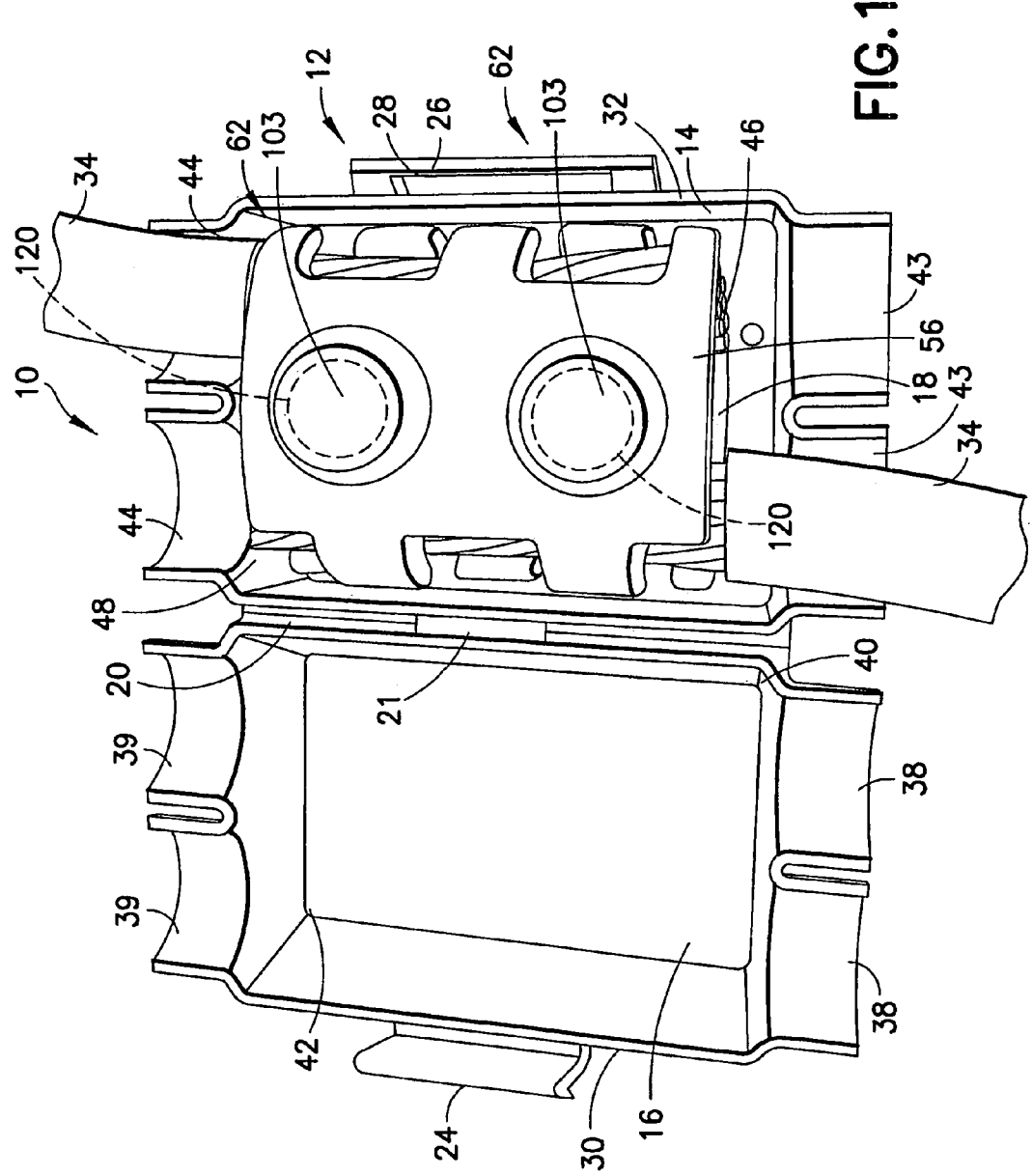
FIG. 1 is a top view of an assembly of an electrical connector and conductors located on a cover incorporating features of the invention.

In accordance with one aspect of the invention, a protective cover for securely housing at least one fastened electrical connector therein is provided comprising a top section; and a bottom section moveably connected to the top section. The bottom section comprises a connection area with at least one seat therein extending down within the connection area. The at least one seat is adapted to receive and fixedly hold a lower portion of at least one fastener of the at least one fastened connector.

In accordance with another aspect of the invention, a protective cover for securely housing at least one bolted electrical connector therein is provided comprising a top section; and a bottom section moveably connected to the top section. The top and bottom sections further comprise a latch and catch locking mechanism for locking the top and bottom sections of the protective cover in a closed position. The top section and bottom sections each comprise a pair of front sleeves and rear sleeves protruding outwardly from front and rear sidewalls of the top and bottom sections for receiving a plurality of electrical conductors therethrough. The bottom section further comprises a top surface and a connection compartment. The top surface is adapted for supporting the at least one bolted electrical connector thereon. The top surface comprises a recess in a portion therein adapted to receive a portion of a lower thread of at least one bolt of the at least one bolted electrical connector therethrough. The recess extends into the connection compartment of the bottom section which comprises a connection area. The connection area comprises a lower ledge and a base portion, wherein the base portion is located beneath the lower ledge within the connection compartment. The lower ledge comprises an upper surface. At least three seats are provided therein. The seats extend down through the lower ledge and into the base portion. The at least three seats are adapted to receive and securely stabilize the lower thread of the at least one bolt of the at least one bolted connector within at least one of the seats.

In accordance with one method of the invention, a method of housing at least one fastened electrical connector within a protective cover is provided comprising providing a cover having a top section and a bottom section moveably connected to one another; placing a lower portion of at least one fastener of the at least one fastened electrical connector through a recess in a portion of a top surface of the bottom section of the cover leading into a connection area; and press-fit inserting the lower portion of the at least one fastener into at least one seat provided within the connecting area for securely mounting the at least one electrical connector in place within the cover.

DETAILED DESCRIPTION OF THE PREFERRED EMBODIMENTS

The invention relates to improved protective covers and methods of using the same, for securely housing one or more fastened electrical connectors, e.g. bolted electrical connectors, in place within the cover. The invention achieves the above by providing a protective cover having a plurality of openings therein for receiving a plurality of conductors (e.g. cables or wires) and comprises a top and a bottom section, wherein within the bottom section of the cover is a connection compartment comprising a connection area. The connection area has one or more orifices with accompanying channels provided therein. Each of the orifices are configured to provide an opening for a lower portion of at least one fastener (e.g. bolt) of at least one fastened connector (e.g. bolted connector) to be received therethrough and into an accompanying orifice channel for storage therein, thereby insuring a secure press fit for the bolted connector within the cover.

In preferred embodiments, at least three orifices with an accompanying channel for each orifice is provided within the connection area within the bottom section of the cover. The use of at least three orifices with accompanying channels in conjunction with the cover is preferred because it provides a universal cover which may house several different combinations of fastened connecters of varying sizes therein using this cover 14.

For example using a three orifice/channel configuration, the cover could securely house the following fastened electrical connectors of varying sizes therein: i) a single bolt connector, (ii) a double bolt connector (with the bolts either side-by-side or spaced apart), (iii) a triple bolt connector, (iv) two or three single bolt connectors, or (v) a double bolt connector and a single bolt connector. Moreover, by widening or lengthening the dimensions of the cover, varying the location of the placement of the orifices on the connection area and/or by increasing the number of orifices, even further combinations of fastened electrical connectors which may be securely housed within the cover may be obtained.

In securely housing the fastened electrical connector or connectors (e.g. bolted electrical connectors) within the cover, one would mount the electrical connector or connectors onto the top surface of the bottom section of the cover by positioning a portion of the body of the bolt or bolts of the connector, (e.g portion of the body of the bolts having the nuts/washers therein) along with the lower portion or lower thread of the bolt or bolts through the recess in the top surface of the bottom section of the cover and into the connection compartment. The user could then press the entire lower thread portion of the bolt or bolts of the electrical connector through one or more orifices, depending upon the number of bolts of the connector, and into the accompanying channel or channels for being securely housed therein. The walls of each of the accompanying channels to the orifices can act as stabilizing walls to secure and stabilize the fasteners, e.g. bolts, of the connectors in place within the cover, thereby preventing the electrical connector(s) from shifting or moving while being housed within the cover.

Once the electrical connector has been installed within the cover in the manner described above, the connector will remain securely connected within the cover, even while the cover is open via the bolts/channel connection and without the need for the user having to physically hold the electrical connector in place, thereby allowing for much easier inspection or other type of work to be performed by the user on the electrical connector being housed within the cover. In other words, the connection forms a hands-free connection.

Different embodiments of the improved protective cover of the invention for housing of one or more fastened electrical connectors will be discussed in greater detail below.

For example, referring to FIGS. 1–6, there is an electrical connector and cover assembly 10 embodiment incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

Figure 8:
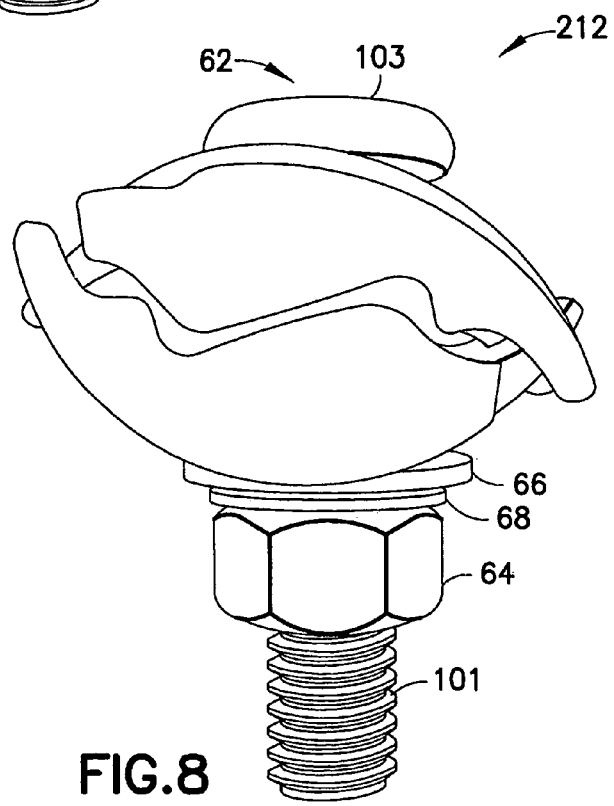
FIG. 8 is a single-bolt connector for use with the protective cover shown in FIGS. 4–6.
Figure 9:
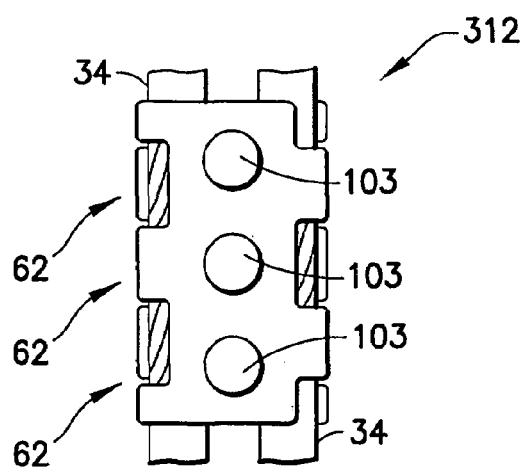
FIG. 9 is a triple-bolt connector for use with the protective cover shown in FIGS. 4–6.

The assembly 10 of the embodiment of FIGS. 1–6 generally comprises a fastened electrical connector 12, (e.g. a double bolt connector) and a protective cover 14 for securely housing the fastened electrical connector(s). Although the embodiment of FIGS. 1–6 depicts a double bolt connector housed within the cover 14, the protective cover 14 of this embodiment is not limited to use with a double bolt connector. The cover 14 is a universal protective cover in that it may securely house several different combinations of fastened electrical connectors of varying sizes therein. For example, the protective cover 14 of this embodiment may securely house any one of a single bolt connector 212 (see FIG. 8), double-bolt connector (FIGS. 1–3 and 7) or triple bolt connector 312 (see FIG. 9) of various sizes. In addition, as will be described in further detail below, even further combinations of fastened electrical connectors, besides those mentioned above, may be obtained by making certain adjustments to the cover 14.

Moreover, the electrical connectors can employ other fasteners known in the art besides bolts such as screws or any other type of fastener known in the art for accomplishing the objectives of the invention.

Referring back to the embodiment of the invention depicted in FIGS. 1–6, the protective cover 14 has a top section 16 and a bottom section 18, and is preferably injection molded from a suitable plastic, such as polypropylene as a single piece. The top section 16 and bottom section 18 of the cover 14 are preferably moveably connected to one another at inner side 20 of the top 16 and bottom section 18 of the cover 12 by a flexible plastic living hinge 21. The living hinge 21 allows for ease of movement in opening or closing the cover 14. However, in an alternate embodiment, any suitable connection between the top and bottom sections could be provided.

The cover 14 further comprises a locking mechanism for providing the user with the ability to securely snap lock the cover 14 closed in place. For instance, as shown in FIGS. 1–6, the locking mechanism comprises a latch 24 and catch 26 for allowing the user to securely snap the cover 14 locked in place by positioning the latch 24 within the slot 28 of the catch 26 to obtain a secure snap fit. The latch 24 in this embodiment extends or protrudes outwardly from an outer side wall 30 of the top section 16 of the cover 14 and the catch 26 extends or protrudes outwardly from an outer side wall 32 of the bottom section 18 of the cover 14. However, any other means known in the art for securely locking the cover 14 in a closed position may also be used in accordance with the invention.

The cover 14 is also provided with a plurality of openings or portals therein for receiving a plurality of conductors 34 (e.g. cables or wires) of the electrical connector 12 therethrough. For example in the embodiment of FIGS. 1–6, the top 16 and bottom 18 sections of the cover 14 are preferably each provided with a pair of sleeves 38, 39 and 43, 44. As shown in FIGS. 1–6, a pair of sleeves 38, 39 are located on front wall 40 and on rear wall 42 of the top section 16 of the cover 14. In addition, a pair of sleeves 43, 44 corresponding to the top section sleeves 38, 39 are located on the front wall 46 and rear wall 48 of the bottom section 18 of the cover 14.

Figure 2:
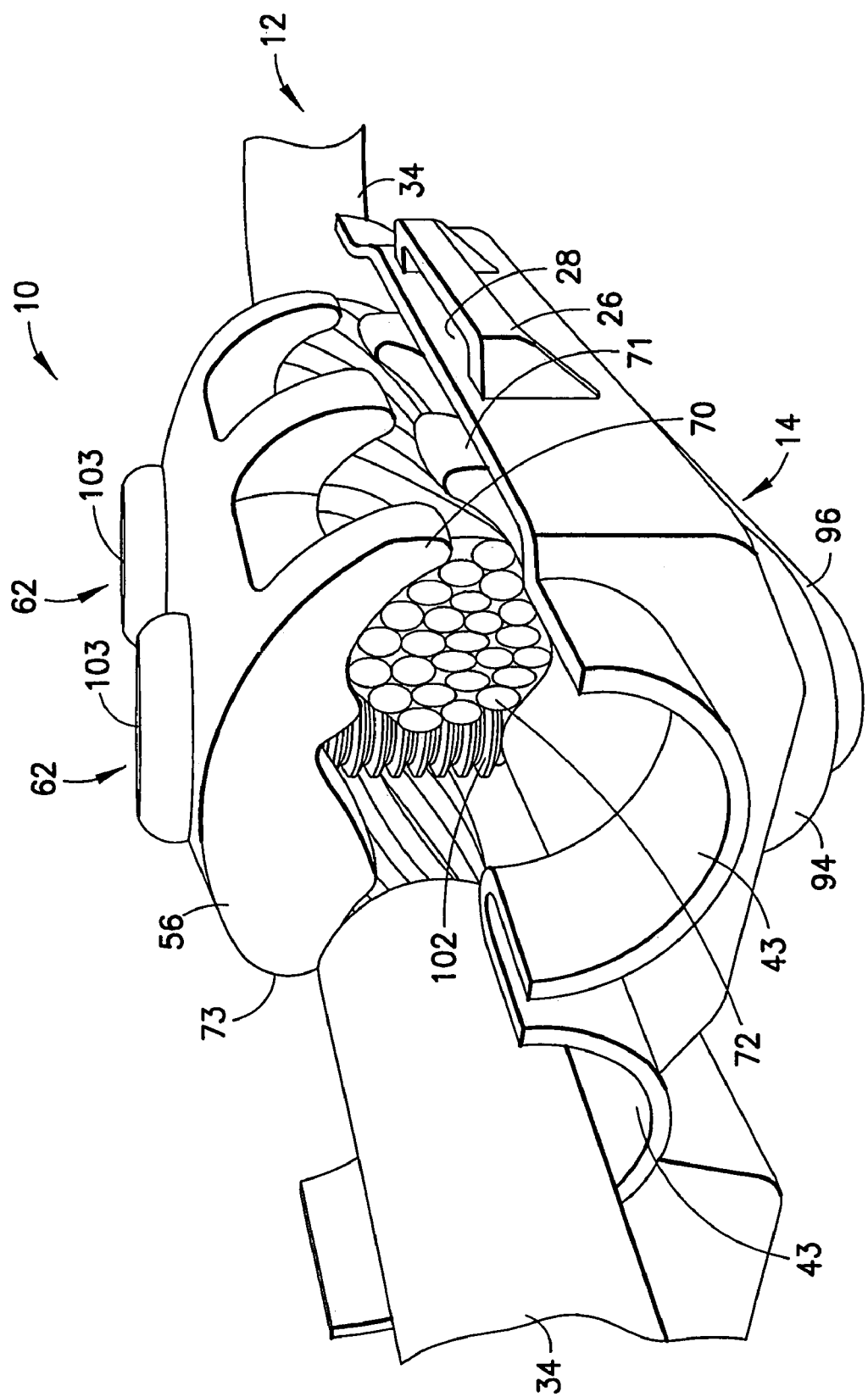
FIG. 2 is a frontal view of the assembly shown in FIG. 1.
Figure 3:
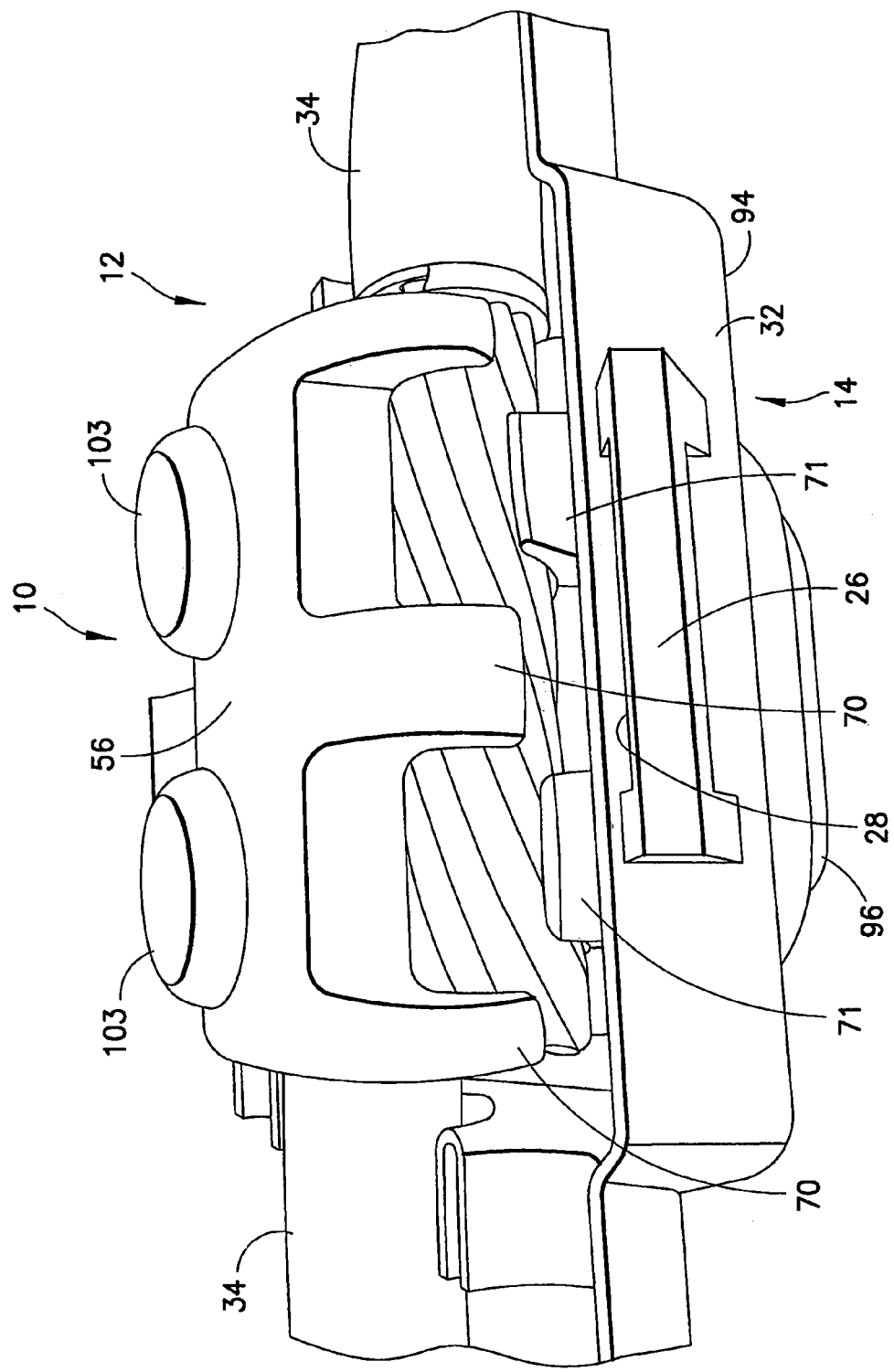
FIG. 3 is a side view of the assembly shown in FIG. 1.

When the cover 14 is in the open position and the electrical connector 12 has already been installed within the cover 14, as depicted in FIGS. 1–3, portions of the accompanying cables or wires 34 (e.g. tap wires and run wires) connected to the electrical connector 12 rest upon the inner surface of each of the sleeves 43, 44 of the bottom section 18 of the cover 14. Once the cover 14 is in the closed position, these corresponding top sleeves 38, 39 and bottom sleeves 43, 44 now abut one another forming portals or openings located in the front and rear of the cover 14 for passage of the electrical conductors 34 therethrough.

In this embodiment, as shown in FIGS. 1–3, a double bolt electrical connector is housed within the cover 14. However, as discussed, the cover 14 of the assembly 10 is a universal cover adapted to securely house several different combinations of fastened electrical connectors of varying sizes. It is further noted that the interior of the protective cover 14 is also preferably designed to accommodate workman's gloves therein for allowing the user to more safely install, inspect or perform other related work on the electrical connector housed within the cover.

The fastened electrical connector(s) 12 for use with the invention, such as bolted connectors, are comprised of a conductive material, preferably either copper or aluminum. Some examples of preferred fastened electrical connectors 12 for use with the cover 14 of the embodiment of FIGS. 1–6 of the invention include, but are not limited to, the copper two-bolt connector sold by FCI/Burndy as unit number USC4W28, the aluminum two-bolt electrical connector sold by FCI/Burndy as unit number USCG28RS, the copper single-bolt electrical connector sold by FCI/Burndy as unit number USC6W25 and the aluminum single-bolt electrical connector sold by FCI/Burndy as unit number USCG25RF. Other fastened electrical connectors known in the art may also be used in accordance with the cover 14 of the invention.

Figure 7:
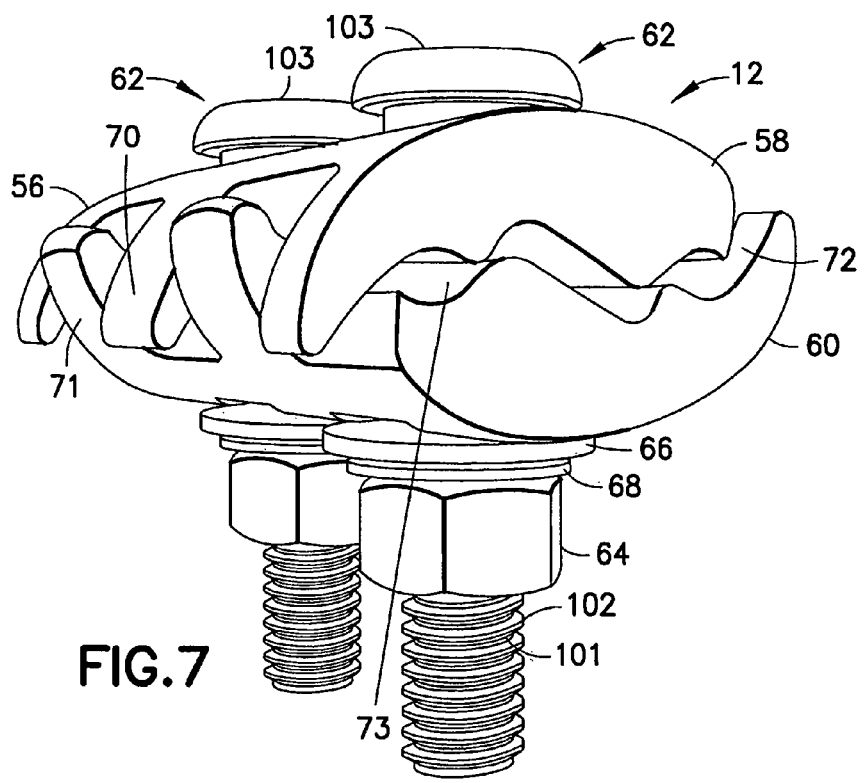
FIG. 7 is a two-bolt connector for use with the protective cover shown in FIGS. 4–6.

The two bolt electrical connector 12 of this embodiment is made preferably of copper or aluminum and comprises a body 56 having two interchangeable halves 58, 60. As best shown in FIG. 7, the halves 58, 60 are clamped together via two side-by-side bolts 62. Each of the bolts 62 comprises a head 103, a body 102 and a lower portion or lower thread 101. Provided on a portion of the body 102 of each of the bolts, just above the lower thread portion 101 are accompanying nuts 64 and lockwashers 66, 68. The bolts 62 extend through openings 120 in the top of halve 58 of the electrical connector and out through the bottom of halve 60 to clamp the two halves 58, 60 of the electrical connector 12 together.

The two clamped halves 58, 60 form interlocking jaws 70, 71 and a pair of front grooves 72, 73 and rear grooves (not shown). The interlocking jaws 70, 71 and front grooves 72, 73 and rear grooves insure a firm grip with ample contact on the electrical conductor of the cables or wires 34 by the connector 12. In alternative embodiments, the two bolts 62 of the electrical connector 12 may be spaced apart rather then being positioned substantially side-by-side.

Moreover, the electrical connector 12, such as the double bolt connector of this embodiment, is preferably a universal electrical connector meaning that it may accommodate a large range of wires or cables in the front grooves 72, 73 and rear grooves of the connector. A clear advantage of having a universal electrical connector is that stock sizes for the connectors may be kept to a minimum by using one size instead of several sizes of parallel clamps.

The secure housing connection of the two bolt electrical connector 12 within the protective cover 14 is accomplished via seats 80–82 for each orifice provided in a connection area 88 of a connection compartment 90 within the bottom section 18 of the cover 14. In this embodiment, three seats 80, 81, 82 are provided in the connection area 88. However, in alternate embodiments, more or less than three seats could be provided. The seats could also have one or more different shapes and/or sizes. The lower portion 101 of each of the bolts 62 of the electrical connector 12 are press-fit mounted within the seats 80–82 so as to prevent movement or shifting of the electrical connector 12 within the cover 14. The press-fit mounting provides a frictional interference fit to frictionally hold the lower portions 101 in the seats 80–82. In an alternate embodiment, the seats could comprise one or more features for an interference fit in addition to, or as an alternative to, the frictional press-fit engagement.

Besides securing and stabilizing the electrical connectors 12 in place within the cover 14, as will be described in greater detail below, the use of at least three seats 80, 81, 82 in the bottom section 18 of the cover 14 also provides a user with the option of housing several different combinations of electrical connectors of varying sizes using the same cover. Although this embodiment describes the use of three seats to secure the bolts of the connector, in other embodiments more than three seats or less than three seats may also be utilized in practicing the invention. Nevertheless, it is preferred that at least three seats be utilized in order to allow for several different combinations of fastened electrical connectors of varying sizes to be securely housed within the cover.

Referring back to the assembly 10 of FIGS. 1–6, the bottom section 18 of the cover 14, wherein the seats 80, 81, 82 are located, comprises an upper layer or top surface 92 and the connection compartment 90. The top surface 92 of the bottom section 18 of the cover 14 is the surface upon which the body 56 of the electrical connector or connectors (e.g. the two bolt connector in this embodiment) are placed upon or mounted for being housed within the cover 14. Provided within the top surface 92 of the bottom section 18 of the cover 14 is a recess or opening 98 leading down into the connection compartment 90 which is located within the bottom section 18 of the cover 14. The connection compartment 90 comprises the connection area 88. Connection area 88 is the area in which the bolts 62 of the electrical connector 12 are secured within the cover 14, as will be described in further detail below. The connection area 88 comprises the seats 80–82.

The connection area 88, located within the connection compartment 90 of the bottom section 18 of the cover 14, comprises lower ledge 94 and base portion 96. As shown in the embodiment of FIGS. 2, 4, 4(a) and 6, the lower ledge 94 has an upper surface 100 with the three seats 80, 81, 82 provided therein. Each of the seats 80–82 has an orifice in the upper surface 100 of the lower ledge 94 which provides an opening into the seats 80–82. The seats extend through the lower ledge 94 and terminate within the base portion 96 of the bottom section 18 of the cover 14. The seats are configured to provide an opening for the bottom ends of the lower threaded portion 101 of the bolts 62 (the portion of the bolt beneath the nuts 64/washers 66) of the electrical connector to be received therethrough, and into the seats 80–82.

In this embodiment, the seats appear in a linear side-by-side fashion in relation to each other and are also substantially equidistant to one another. However, in alternative embodiments, the seats may be spaced apart from one another rather than being side-by-side.

Each of the seats 80, 81, 82 functions to securely house therein the lower thread portion 101 of the bolts 62 of the electrical connector 12 received through the orifices into the seats. In particular, the walls 104, 106, 108 of each of the seats act as stabilizing and gripping walls to secure and stabilize the bolts 62 of the connectors in place within the cover, thereby preventing the electrical connector(s) from shifting or moving while housed within the cover. Thus, the dimensions of the seats within the bottom section of the cover are designed to insure that a secure press fit is obtained for these bolts of the electrical connector being housed within the cover.

Additionally, in this embodiment, the seats 80–82 which securely house the lower thread portion 101 of the bolts 62 therein, extend down into the base portion 96 of the bottom section 18 of the cover 14 and terminate therein. The base portion 96, thus, provides a sub-housing for the accompanying seats 80–82 and the thread portion 101 of the bolts 62. Further, as is evident from FIGS. 2 and 3, the exterior of the base portion 96 of the cover 14 may also function to balance the protective cover 14 from tipping over on the work surface onto which it is placed; after or during when the electrical connector 12 is securely connected within the cover 14.

When the electrical connector 12 has been securely connected within the cover 14 as shown in FIGS. 1–3, the electrical connector 12 can be mounted on the top surface 92 of the bottom section 18 of the cover 14, with the nuts 64/washers 66 and lower thread portion 101 of the bolts 62 of the electrical connector 12 extending down into the connection compartment 90 through recess 98. The nuts 64/washers 66, 68 are housed within the connection compartment 90. The nuts 64 can rest on the upper surface 100 of the lower ledge 94 of the bottom section 18 of the cover 14. Moreover, as discussed, the lower threaded portion 101 of the bolts, underneath the nuts 64/washers 66, 68 are received through the orifices located in the upper surface 100 of the lower ledge 94 of the bottom section of the cover and securely housed within the seats 80–82. In this embodiment, since a double-bolt connector is being used, only two of the three seats 80, 81, 82 will be occupied with bolts 62.

Figure 4A:
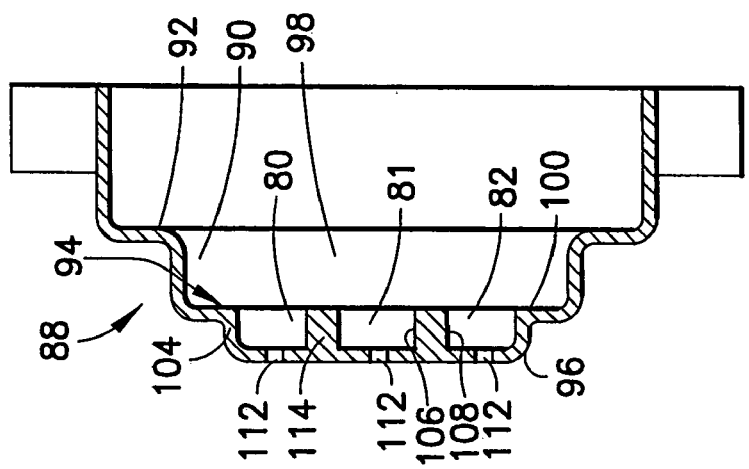
FIG. 4(a) is a cross sectional view along line A—A of the protective cover of FIG. 4.
Figure 4:
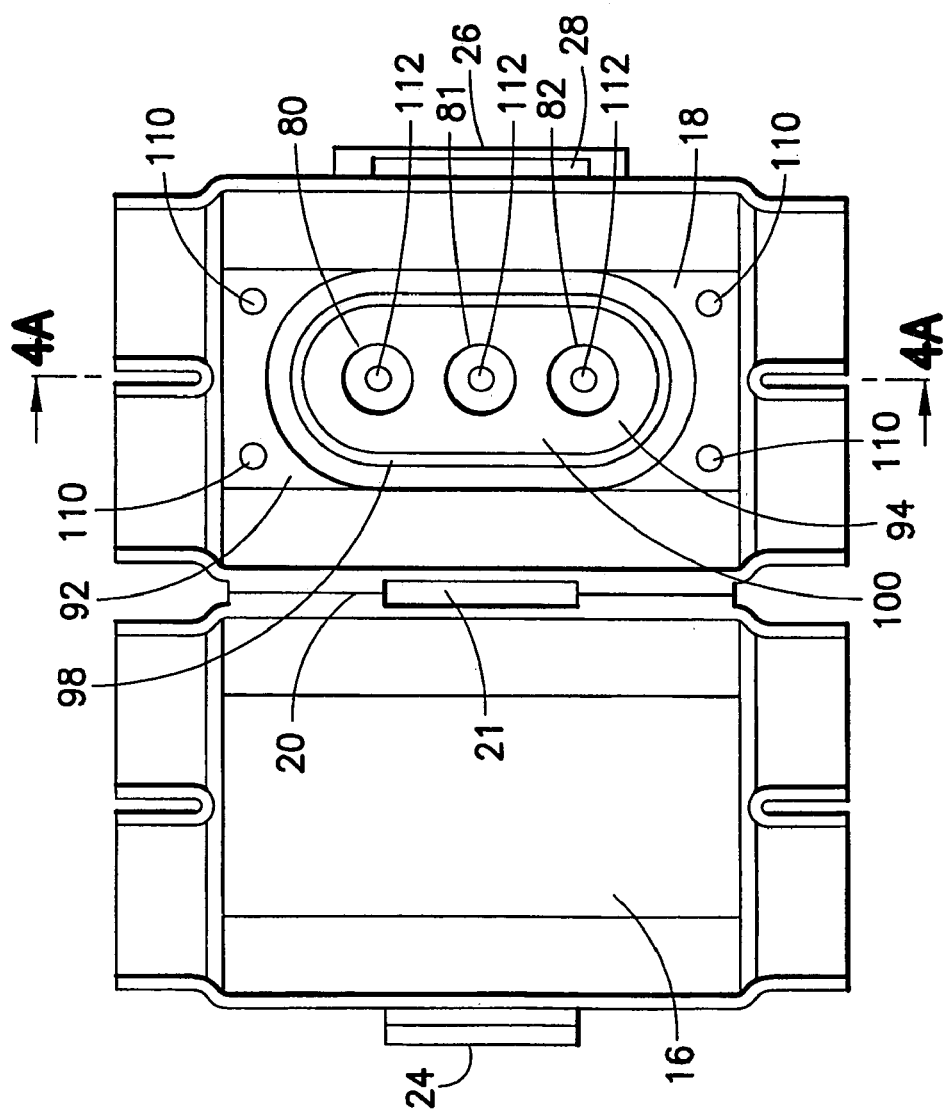
FIG. 4 is a bottom view of the protective cover shown in FIG. 1.
Figure 5:
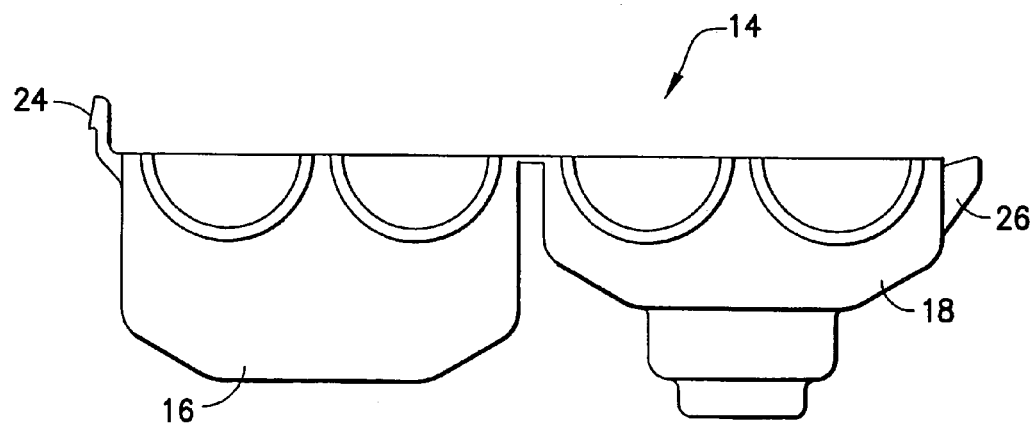
FIG. 5 is an end view of the protective cover shown in FIG. 4 in an open position.
Figure 6:
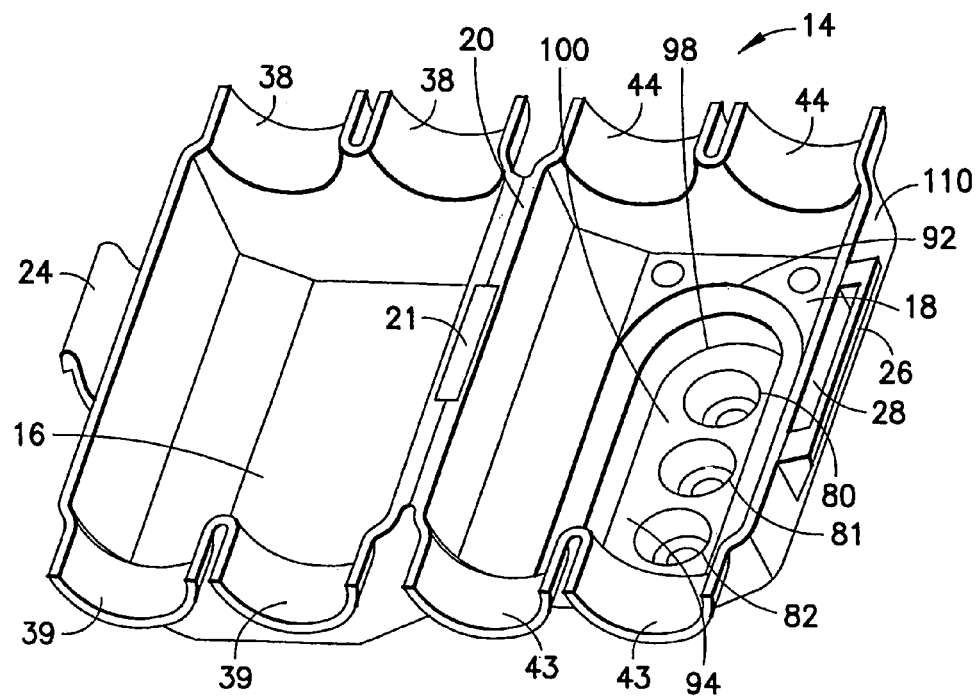
FIG. 6 is a perspective view of the protective cover shown in FIG. 4 in an open position.

As shown in FIGS. 1, 4, and 6, a top set of drainage holes 110 and a bottom set of drainage holes 112 are also preferably provided in the bottom section 18 of the cover 14 to drain out any moisture or other contaminants which may have seeped into the cover; e.g., during adverse weather conditions. The top set of drainage holes 110 are preferably provided in the top surface 92 of the bottom section 18 of the cover 14. In addition, the bottom set of drainage holes 112 are preferably provided through a lower surface 114 of the base portion 96 of the bottom section 18 of the cover 14 and these bottom drainage holes 112 provide an opening for any moisture or other contaminants to exit and, thus, be removed from the cover.

In using the assembly of FIGS. 1–3 to secure bolted connectors in place within the protective cover, first a user would assemble the electrical connector 12 or connectors (in this case, the two bolt connector 12) by loosening the bolts 62 of the connector to a level sufficient to accommodate the conductors 34 (e.g. tap and main wires) within the front grooves 72, 73 and rear grooves of the electrical connector 12. Once the wires 34 were placed within the front grooves 72, 73 and rear grooves, the user would then tighten the bolts 62 to clamp the wires securely between the body members 58, 60 in the front grooves 72, 73 and rear grooves. Next, if not already open, the user would open the cover 14 by unlatching the latch 24 from the catch 26. The cover 14 could then be placed down in the open position upon the working surface, as shown in FIGS. 2–3.

At this point the user could then securely mount the assembled two-bolt electrical connector 12 onto the top surface 92 of the bottom section 18 of the cover 14 by first placing a portion of the nuts 64 and washers 66, 68 and lower thread 101 of each of the bolts 62 of the assembled two-bolt connector 12 through the recess 98 in the top surface 92 of the bottom section 18 of the cover 14 and snap or press the bottom ends of the lower thread 101 of each of the two bolts 62 of the electrical connector 14 through orifices in the upper surface 100 of the lower ledge 94 of the bottom section 18 of the cover 14. The lower thread 101 of each of the bolts 62 would go through one of the orifices and extend down into the seats 80–82. In this embodiment, only two of the three seats 80–82 would be occupied since a double bolt connector is being utilized.

The walls 104, 106, 108 of the seats 80–82 stabilize each of the bolts 62 therein, thereby obtaining a secure press fit for electrical connector 12 housed within the cover 14. The secure press fit obtained for the electrical connector 12 insures that the electrical connector 12 will not shift or move within the cover 14.

Moreover, once the electrical connector 12 has been connected within the cover 14 in the manner described above, the connector 12 will remain securely connected in place within the cover 14 via bolts 62/seats 80–82 connection, even while the cover 14 is open and without the need for the user having to physically hold the electrical connector 12 in place, thereby achieving a hands-free connection or pre-holding feature for the assembly 10. This hands-free feature of the protective cover 14 allows for a much easier inspection or other related work to be performed on the electrical connector housed within the cover than permitted by conventional electrical connectors covers.

After mounting the electrical connector 12 within the cover 14 as described, the user would then close the cover 14 for protecting the electrical connector 12 by moving the top section 16 of the cover 14 on top of the bottom section 18 of the cover 14. The user can then lock the cover in place by snapping the latch 24 into the slot 28 of the catch 26.

When the user has finished using the electrical connector 12 or just wants to change the wires 34, the user can open the protective cover 14 and remove the electrical connector 12 from the cover 14 by lifting the connector 12 upwards to disengage the two bolts 62 from the two respective seats from which they are housed. The user may then either place a new electrical connector or the same electrical connector, but with one or more different or additional wires within the protective cover for re-using the cover 14 in the same manner described above. The above described method is meant for illustrative purposes only and is in no way meant to limit the scope of practicing the invention.

In alternative embodiments, as discussed above, other bolted electrical connectors, besides two-bolted connectors 12 may also be housed within the protective cover depicted in FIGS. 1–6, such as single bolt connectors 212 and triple bolt connectors 312 for example. The single bolt 112 or triple bolt 212 electrical connectors could be housed within the protective cover depicted in FIGS. 1–6 in essentially the same manner as the two-bolted connector described above, except for the following differences set forth below.

For example in embodiments housing one or more single bolt connectors (see FIG. 8) within the protective cover of FIGS. 1–6, each single bolt of the connector would be press fit into only one of the three seats within the bottom section of the cover; as opposed to two bolts being press fit into two of the three seats of the bottom section of the cover as is the case with the two bolt-connector embodiment described above. As for embodiments relating to housing a triple bolt connector (see FIG. 9) within the protective cover of FIGS. 1–6, all three bolts of the triple bolt connector would be press fit into each of the three seats within the bottom section of the cover.

In other embodiments, the protective cover of FIGS. 1–6, can securely house fastened electrical connectors of various sizes therein. For example, in these embodiments, the cover 14 may house a variety of different sizes of single-bolt, double-bolt, or triple bolt connectors therein.

In yet, other embodiments of the invention, instead of the three seats 80, 81, 82 being arranged in a linear side-by-side fashion with respect to one another in the bottom section 18 of the cover as shown in FIGS. 4, 4(a) and 6, the three seats 80–82 could alternatively be spread out from one another and the cover 14 dimensions lengthened and/or widened in comparison to the protective cover depicted in FIGS. 1–6 such that the cover 14 may securely house any of one the following possible combination of electrical connectors of varying sizes therein. These possible combinations include (i) a single bolt connector, (ii) a double bolt connector (with the bolts either side-by-side or spaced apart) (iii) a triple bolt connector, (iv) two or three single bolt connectors, or (v) a double and a single bolt connector.

In still other embodiments of the invention, the number of seats provided within the bottom section of the protective cover could also be less than three for accommodating only single and/or double bolt electrical within the cover.

In still further embodiments of the invention the number of seats provided within the bottom section of the protective cover could also be greater than three. By providing more seats and wider/longer protective covers one can further increase the possible number or combinations of bolted electrical connectors which may be housed within the cover.

Figure 10:
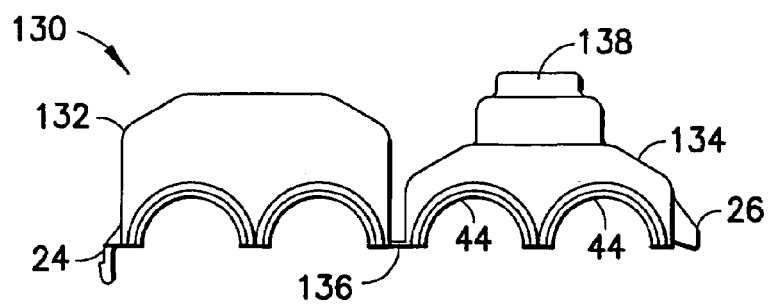
FIG. 10 is an end view of an alternate embodiment of the invention.
Figure 11:
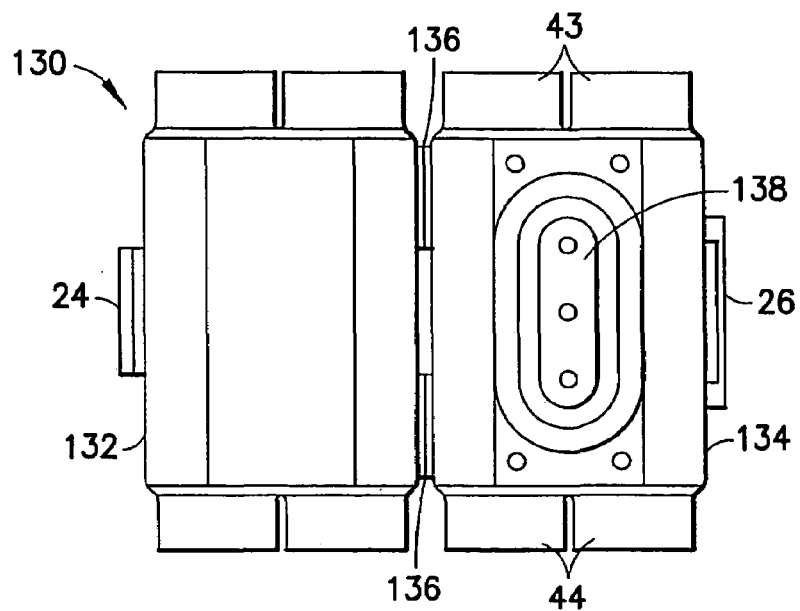
FIG. 11 is a bottom plan view of the cover shown in FIG. 10.
Figure 12:
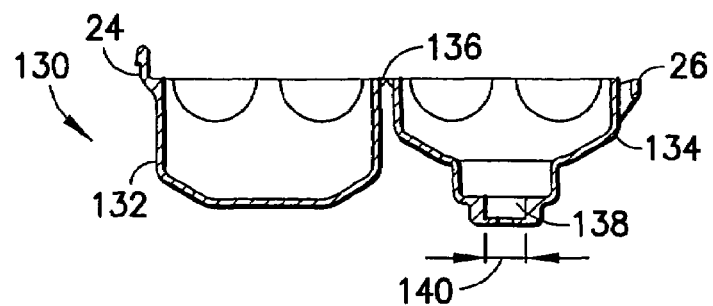
FIG. 12 is a cross sectional view of the cover shown in FIGS. 10–11.
Figure 13:
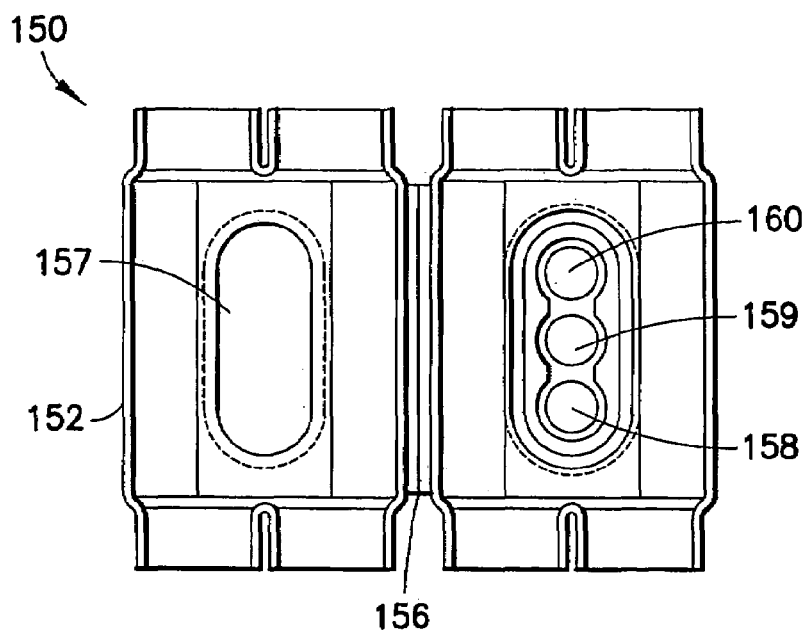
FIG. 13 is a top plan view of an alternate embodiment of the invention.
Figure 14:
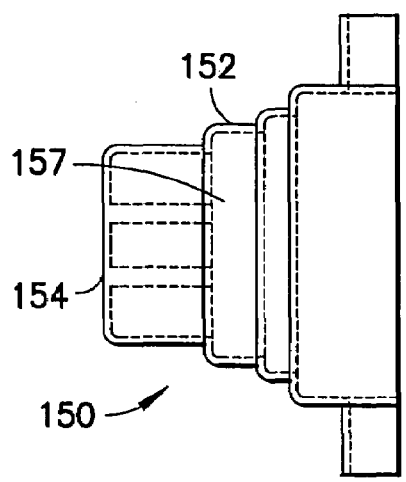
FIG. 14 is a left side view of the cover shown in FIG. 13.
Figure 15:
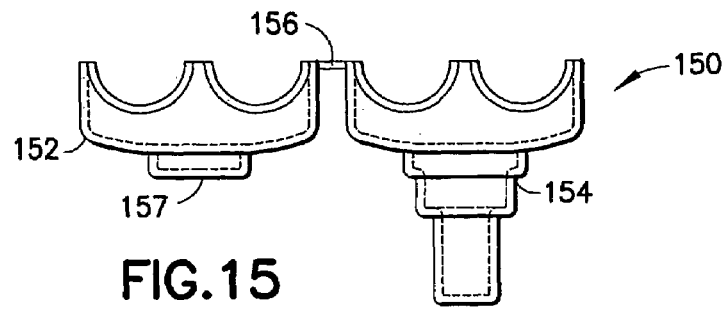
FIG. 15 is an end view of the cover shown in FIG. 13, the opposite end being a mirror image thereof.
Figure 16:
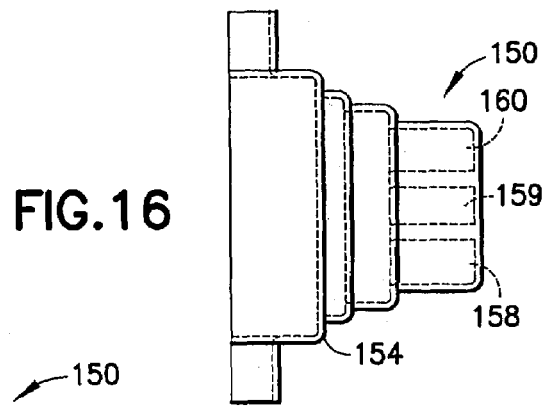
FIG. 16. is a right side view of the cover shown in FIG. 13.
Figure 17:
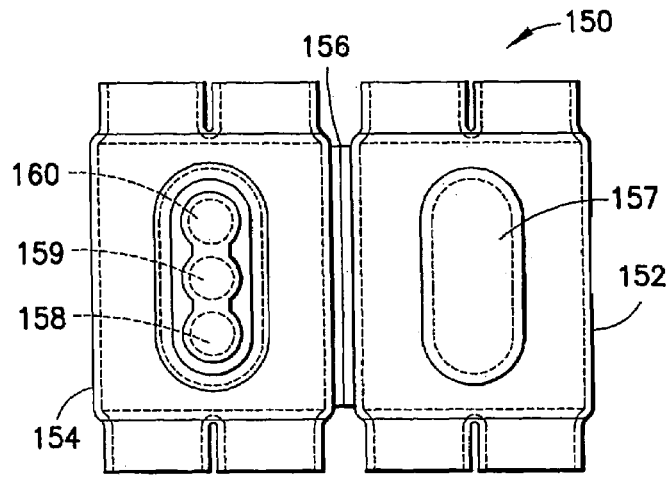
FIG. 17 is a bottom plan view of the cover shown in FIG. 13.

Referring also to FIGS. 10–12 an alternative embodiment of the invention is shown. In this embodiment the cover 130 comprises a top section 132 and a bottom section 134. Preferably, the top and bottom sections 132, 134 are molded together as a one-piece member made of plastic or polymer material, such as a transparent or translucent material for example. Two living hinges 136 pivotably connect the two sections 132, 134 to each other. The top section 132 is the same as the top section 16 with a latch 24. The bottom section 134 is substantially the same as the bottom section 18 with the catch 26 and sleeves 43, 44 except that the bottom section 134 comprises only one seat 138 instead of the three seats 80–82. In this embodiment the seat 138 has a general oblong or lozenge shape. The seat 138 is adapted to have one or more of the ends of the lower thread(s) 110 of a bolt press-fit mounted in the seat 138. The width 140 of the seat 138 is slightly less than the outer diameter of bolt(s) at the lower thread 110. Thus, a frictional interference fit between the cover 130 and the bolt(s) is obtained when the bolt(s) are pressed into the seat 138. This could enable flexure of the side walls at the seat 138 for a spring type holding of the bolt(s). This type of seat allows the bolt(s) to be located at any suitable position(s) along the length of the seat. More than two bolts can be located into the same seat 138.

Figure 18:
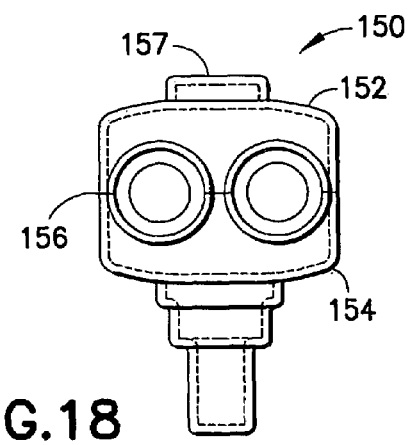
FIG. 18 is an end view of the cover shown in FIGS. 13–17 in a closed position.
Figure 19:
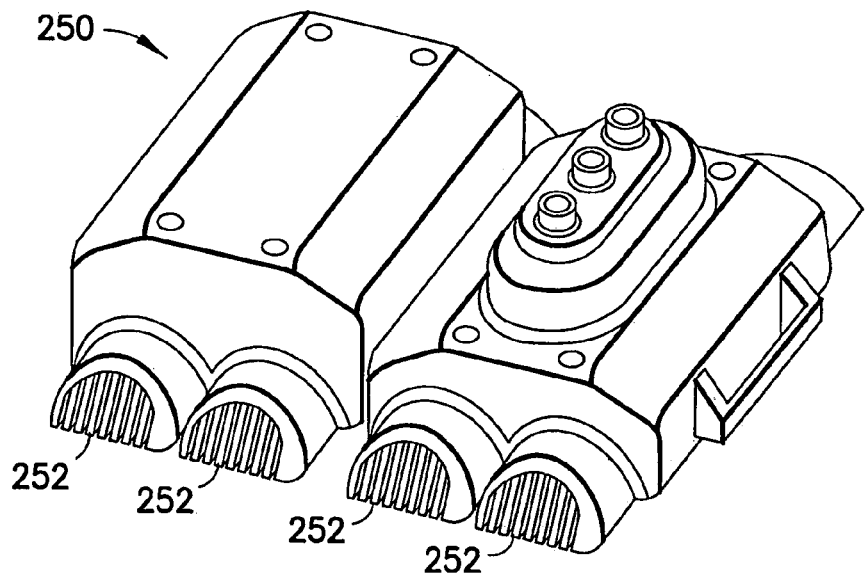
FIGS. 19 and 20 are bottom side perspective views of a cover equipped with flexible fingers.
Figure 20:
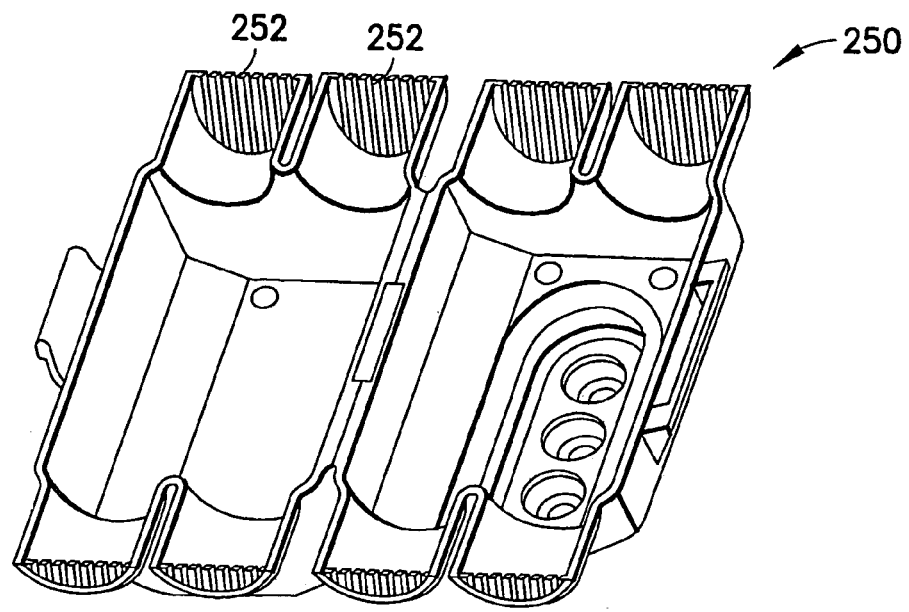
Figure 21:
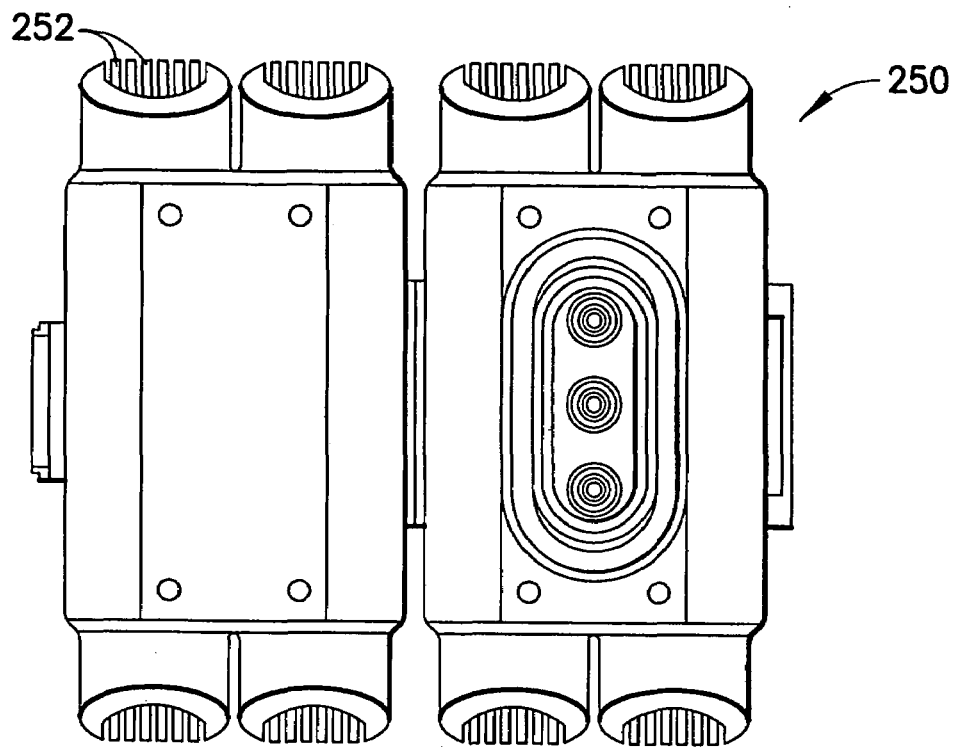
FIG. 21 is a bottom plan view of the cover shown in FIGS. 19 and 20.
Figure 22:
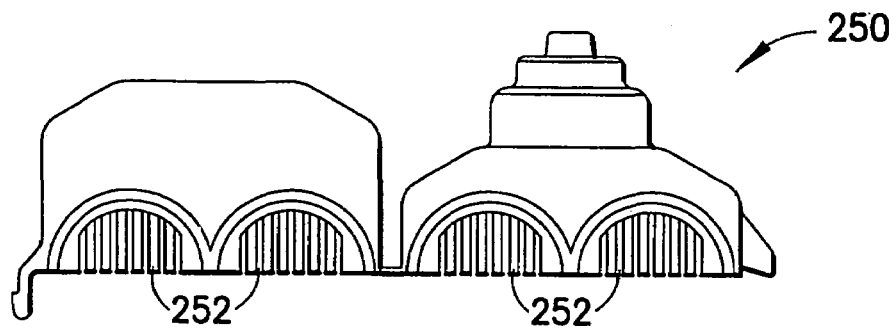
FIG. 22 is an end view of the cover shown in FIG. 21, the opposite end being a mirror image thereof.
Figure 23:
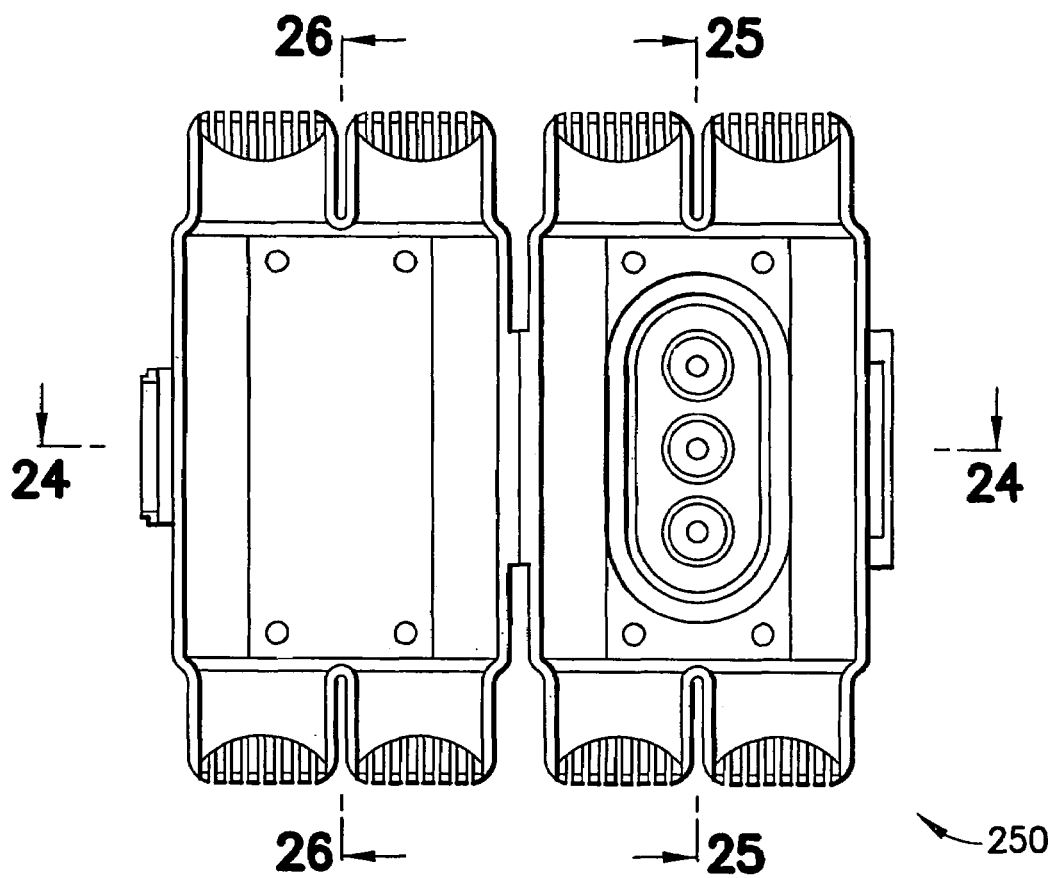
FIG. 23 is a top plan view of the cover shown in FIG. 21.
Figure 24:
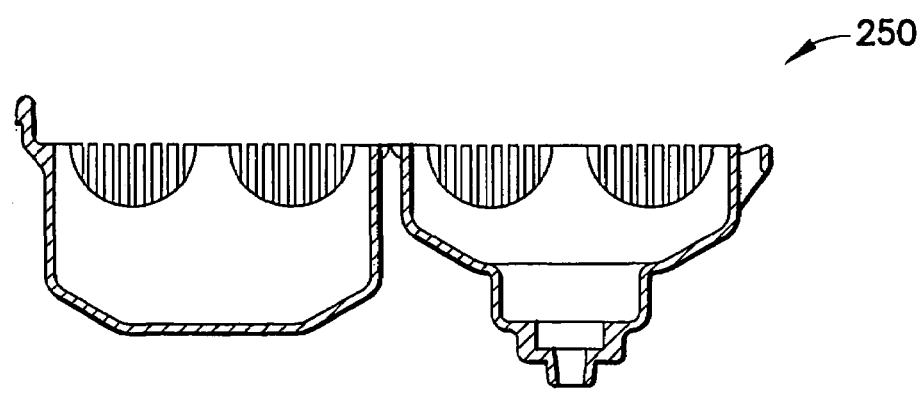
FIG. 24 is a cross sectional view of the cover shown in FIG. 23 taken along line 24—24.
Figure 25:
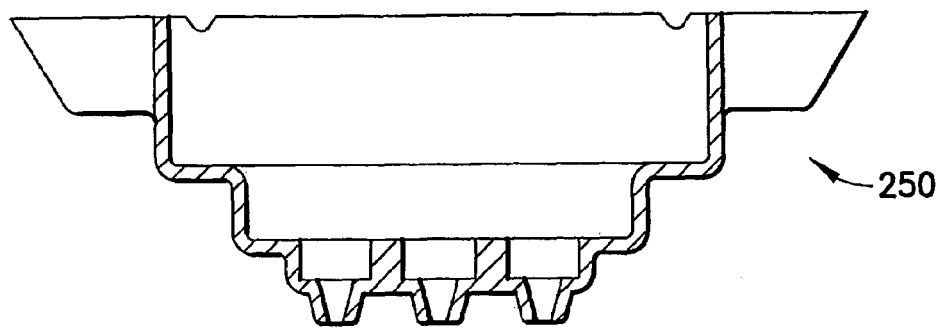
FIG. 25 is a cross sectional view of the cover shown in FIG. 23 taken along line 25—25.
Figure 26:
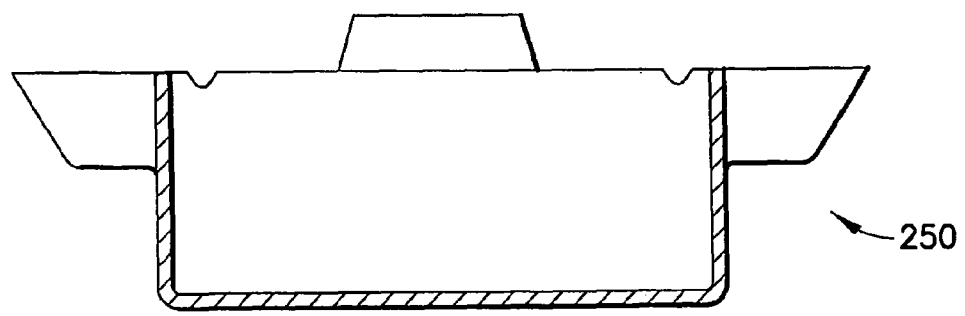
FIG. 26 is a cross sectional view of the cover shown in FIG. 23 taken along line 26—26.

Referring also to FIGS. 13–18 another alternate embodiment of the invention is shown. In this embodiment the cover 150 comprises a top section 152 and a bottom section 154. Preferably, the top and bottom sections 152, 154 are molded together as a one-piece member made of plastic or polymer material, such as a transparent or translucent material for example. One living hinge 156 pivotably connects the two sections 152, 154 to each other. The top section 152 is substantially the same as the top section 16, but does not include the latch 24. The top section 152 also comprises a projecting receiving area 157. The projecting receiving area 157 is sized and shaped to receive the head(s) 103 of the bolt(s) 62. The bottom section 154 is substantially the same as the bottom section 18, but without the catch 26. However, the three seats 158–160 are deeper than the seats 80–82. In addition, the seats 158–160 are slightly open with each other at their sides; forming serpentine shaped side walls connecting the seats 158–160 with each other. This could enable flexure of the side walls for a spring type holding of the bolt(s), but with more surface contact than the embodiment shown in FIGS. 10–12. FIG. 18 shows the cover 150 is a closed position. Any suitably system for retaining the sections 152, 154 in the closed position could be provided.

FIGS. 19–26 show a similar cover 250, with flexible fingers 252 at the sleeves which can seal, at least partially, around a conduit, such as an electrical wire. The fingers 252 are preferably integrally molded with the rest of the cover. The fingers 252 are individually deflectably around the electrical wires when the top and bottom sections of the cover are moved to a closed position. The presence of the fingers helps to prevent dirt and debris from entering the closed cover between the sleeves and the electrical wires. The variable delectably of the fingers also accommodates different diameter wires extending through the wire entry openings formed at the sleeves when the top and bottom sections are closed.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A protective cover for securely housing at least one fastened electrical connector therein, comprising:
    a top section; and
    a bottom section moveably connected to the top section, wherein the bottom section comprises a connection area with a plurality of spaced seats therein extending down within the connection area, wherein the seats are adapted to separately receive lower portions of the at least one fastened electrical connector.

2. The protective cover of claim 1, wherein the at least one fastened electrical connector comprises an assembly comprising at least one bolt.

3. An electrical connector and protective cover assembly comprising:
    at least one fastened electrical connector; and
    the protective cover of claim 2, wherein the at least one fastened electrical connector is housed within the protective cover, wherein the seats comprise at least three seats, and wherein the at least one fastened electrical connector comprises one of the following: a single bolt connector, or a double bolt connector, or a triple bolt connector.

4. The protective cover of claim 1, wherein the connection area comprises a lower ledge and a base portion, wherein the base portion is located beneath the lower ledge within a connection compartment, wherein the lower ledge has an upper surface, wherein the seats extend down through the lower ledge and into the base portion of the connection compartment.

5. The protective cover of claim 1, further comprising a latch and catch locking mechanism for locking the protective cover closed, wherein a latch of the locking mechanism protrudes from an outer side wall of the top section of the cover and a catch of the locking mechanism protrudes from an outer side wall of the bottom section of the cover.

6. The protective cover of claim 1, further comprising a plurality of portals in the cover formed by a pair of front sleeves and rear sleeves protruding outwardly from front and rear sidewalls of the top and bottom sections of the cover.

7. The protective cover of claim 1, wherein the bottom section further comprises a plurality of top drainage holes therein.

8. The protective cover of claim 1, wherein the seats comprise a general lozenge shape.

9. The protective cover of claim 1, wherein the seats comprise multiple contiguous seats with general serpentine shaped walls.

10. A protective cover for securely housing at least one fastened electrical connector therein, comprising:
    a top section; and
    a bottom section moveably connected to the top section, wherein the bottom section comprises a connection area with at least one seat therein extending down within the connection area, wherein the at least one seat is adapted to alternatively receive a first electrical connector comprising one bolt, or a second electrical connector comprising two bolts, or a third electrical connector comprising three bolts, and wherein the at least one seat is adapted to substantially stationarily hold a threaded end of at least one of the bolts in the at least one seat.

11. A protective cover as in claim 10 wherein the at least one seat comprises at least three seats, each seat being sized and shaped to receive the threaded end of one of the bolts of the electrical connector.

12. A protective cover as in claim 10 wherein the at least one seat comprises a single seat adapted to alternatively receive the threaded end of one of the bolts of the electrical connectors, two of the bolts of the electrical connectors, or three of the bolts of the electrical connectors.

13. An electrical connector and protective cover assembly comprising:
    at least one electrical connector; and
    the protective cover of claim 10, wherein the at least one electrical connector is housed within the protective cover, and wherein the at least one electrical connector comprises at least one bolt having an end positioned in the at least one seat.

14. The protective cover of claim 10, wherein the connection area comprises a lower ledge and a base portion, wherein the base portion is located beneath the lower ledge within a connection compartment, wherein the lower ledge has an upper surface, wherein the seats extend down through the lower ledge and into the base portion of the connection compartment.

15. The protective cover of claim 10, further comprising a latch and catch locking mechanism for locking the protective cover closed, wherein a latch of the locking mechanism protrudes from an outer side wall of the top section of the cover and a catch of the locking mechanism protrudes from an outer side wall of the bottom section of the cover.

16. The protective cover of claim 10, further comprising a plurality of portals in the cover formed by a pair of front sleeves and rear sleeves protruding outwardly from front and rear sidewalls of the top and bottom sections of the cover.

17. The protective cover of claim 10, wherein the bottom section further comprises a plurality of drainage holes therein.

18. The protective cover of claim 10, wherein the at least one seat comprises a general lozenge shape.

19. The protective cover of claim 10, wherein the at least one seat comprises multiple contiguous seats with general serpentine shaped walls.

* * * * *